United States Patent

Peitsmeier et al.

[11] Patent Number: 4,840,386
[45] Date of Patent: Jun. 20, 1989

[54] SOUND DEADENING DUAL SLEEVE SEALING ARRANGEMENT

[75] Inventors: Karl Peitsmeier, Neuhausen; Helmut Patzelt, Kernen-Stetten, both of Fed. Rep. of Germany

[73] Assignee: Daimler-Benz Aktiengesellschaft, Stuttgart, Fed. Rep. of Germany

[21] Appl. No.: 171,442

[22] Filed: Mar. 21, 1988

[30] Foreign Application Priority Data

Mar. 19, 1987 [DE] Fed. Rep. of Germany ....... 3709027

[51] Int. Cl.⁴ ............................. F16J 3/04; F16J 15/52
[52] U.S. Cl. .............................. 277/212 FB; 277/97; 403/51; 74/18.1
[58] Field of Search .................. 277/212 FB, 34, 34.3, 277/34.6, 97, 226; 403/50, 51; 74/18, 18.1, 18.2

[56] References Cited

U.S. PATENT DOCUMENTS

| | | | |
|---|---|---|---|
| 1,885,121 | 11/1932 | Loweke | 74/18.2 X |
| 2,880,620 | 4/1959 | Bredtschneider | 403/51 |
| 3,381,987 | 5/1968 | Husen | 277/212 FB X |
| 3,478,607 | 11/1969 | Arbeitlang | 403/51 X |

OTHER PUBLICATIONS

Daimler-Benz, AG, Illustrated Technical Drawing, FG 21930, 200D-300E, Oct. 1984.

Primary Examiner—Robert S. Ward
Attorney, Agent, or Firm—Barnes & Thornburg

[57] ABSTRACT

The aperture between a positionally stable vehicle passenger space end wall and a steering spindle shaft penetrating a bore in the wall is masked by a sealing sleeve which exhibits a bellows which compensates an offset of the shaft by modification of its form. Attached to the sealing sleeve is a second sleeve with which the first sleeve forms a sound-insulating closed air chamber.

5 Claims, 1 Drawing Sheet

SOUND DEADENING DUAL SLEEVE SEALING ARRANGEMENT

BACKGROUND AND SUMMARY OF THE INVENTION

The invention relates to a sealing sleeve for masking the aperture between a positionally stable wall and a shaft penetrating a bore through the wall, which sleeve includes a bellows for compensating offset positions of the shaft.

A sealing sleeve is known from a publication of Daimler-Benz Aktiengesellschaft of Stuttgart, Federal Republic of Germany, assignee of this application, illustrated in technical drawing FG 21 90, which masks the interstice between a vehicle body end wall of a passenger compartment of a motor car and a steering spindle protruding through a bore in this wall and seals the bore against passage of dirt. So that the installation dimensions, which differ due to tolerances, do no jeopardize the tight fit of the sleeve, the latter exhibits a thin-walled flexible bellows compensating any offset of the steering spindle which occurs.

Because the smallest possible wall thicknesses are aimed at for the sealing sleeve as a whole due to the required resilience, it is unfortunately also necessary to accept that the passage of sound into the passenger compartment, emanating from the units of the engine compartment, occurs particularly strongly at such a sealing point.

This does not appear justifiable, particularly when one considers what outlay is undertaken in vehicles for the desired sound insulation of the engine compartment relative to the passenger compartment, by additional vehicle body partition walls for example, which are intended to achieve better sound insulation.

An object of the invention is therefore to construct a flexible sealing sleeve with improved sound insulation.

This object is achieved by providing a second sleeve which is anchored together with the first sleeve and is disposed to form a sound insulating air chamber between the first and second sleeves at least in the area of the bellows.

The sealing sleeve, which is flexible by virtue of bellows, seals the wall aperture against dirt, dust and spray water, whereas conjointly with the second sleeve connected thereto an air chamber is formed which conjointly with the walls, which are now double-acting, largely prevents the sound waves from penetrating the wall aperture.

It is sufficient in certain preferred embodiments to cover only the bellows when they are made thinner-walled and more sound-permeable than an adjacent more stable sleeve wall by a drawing operation in production.

In certain advantageous preferred embodiments, the second sleeve exhibits externally a cylindrical external circumference, whereby the overall volume is only slightly increased compared to a single sealing sleeve, but due to the interval between the sleeve walls the compensating movement of the bellows of the sealing sleeve is not obstructed.

In certain preferred embodiments a combination of the two sleeves which is favorable for production is provided, wherein the second sleeve is molded integrally onto the sealing sleeve at one end, and by inversion round the latter and clipping in of a free end forms a sound-insulating air chamber conjointly therewith.

Other objects, advantages and novel features of the present invention will become apparent from the following detailed description of the invention when considered in conjunction with the accompanying drawings.

DETAILED DESCRIPTION OF THE DRAWINGS

Figure 1:
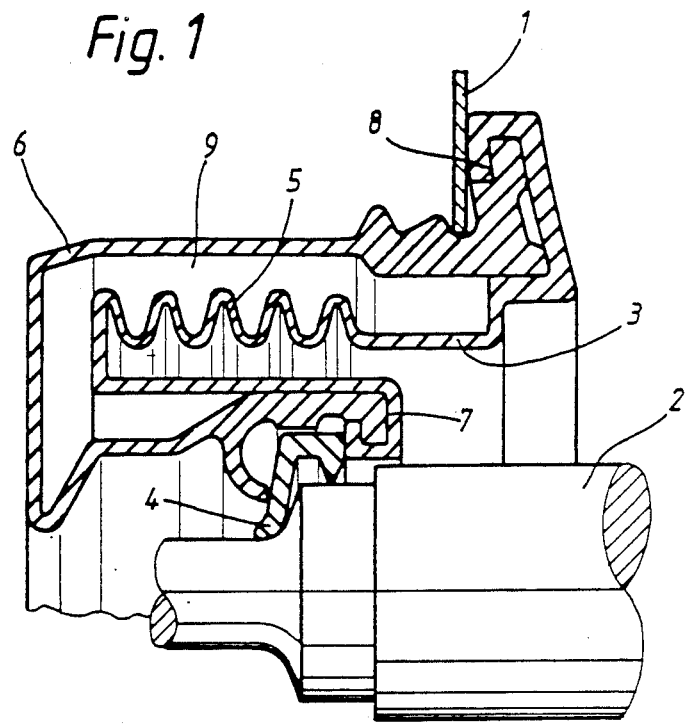
FIG. 1 is a partial schematic, part sectional view of a sealing sleeve between a wall aperture and a steering spindle shaft with a second sleeve connected thereon, constructed in accordance with a first preferred embodiment of the invention.

In FIG. 1, a sealing sleeve 3 is arranged to mask an aperture between a vehicle body end wall 1 of a passenger compartment of a motor car, not further shown, and a steering spindle 2 penetrating a bore in the end wall 1. Sealing sleeve 3 abuts the end wall 1 with one end region and the steering spindle 2 at the other end via a sealing part 4 accommodated rotationally stably thereby. In a median region, the sealing sleeve 3 exhibits a bellows 5 by which an accurate seating of the sealing sleeve 3 is ensured even in the event of a steering spindle 2 offset out of the center, within the values of the installation tolerances, because it compensates such an offset by modification of its form.

This sealing sleeve 3 has attached to it externally a second sleeve 6, which is clipped to the ends of the sealing sleeve 3 at two connection points 7, 8.

Because the second sleeve 6 is less resilient than the sealing sleeve 3 with the bellows 5, the interval between its walls is determined by its configuration so that during the movement of the bellows 5 compensating an offset of the steering spindle 2, sleeve 3 and 6 can execute a corresponding relative movement between their connection points 7, 8.

The sound can no longer pass unobstructed through the closed double-walled air chamber 9 constructed in this manner, but is attenuated.

The second sleeve 6 exhibits a cylindrical external circumference, whereby the overall volume of the combined sleeves 3 and 6 does not substantially exceed that of a single sealing sleeve 3, so that the use of the combined sleeves 3 and 6 creates no installation problems.

Figure 2:
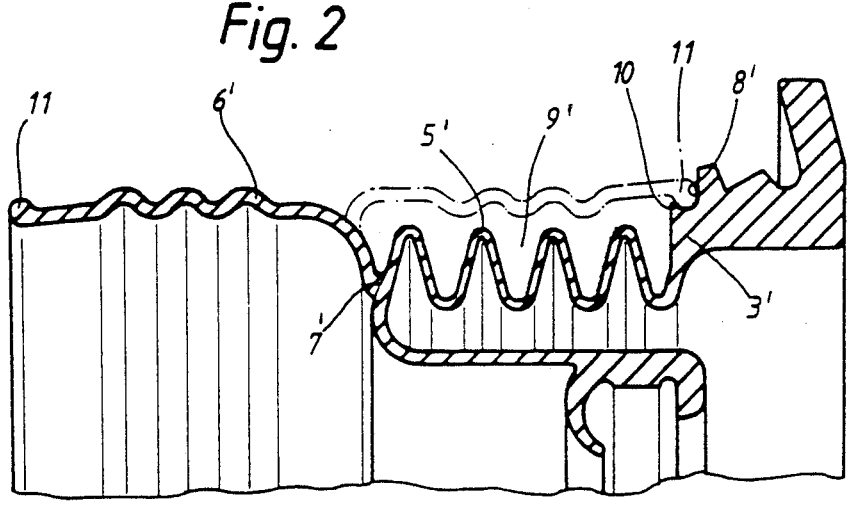
FIG. 2 is a partial view of another preferred embodiment of the invention with a sealing sleeve with a second sleeve molded on integrally at one end.

In FIG. 2, a second sleeve 6' is molded integrally onto a sealing sleeve 3' at one end 7', and can be inverted over the region of a thin-walled bellows 5' and then clipped in an all-round notch 10 of the sealing sleeve 3' by its appropriately shaped loose end 11 at connection 8'. By this means, in this case again an air chamber 9' is created which reduces the passage of sound in the region of the bellows 5'.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A sealing sleeve arrangement for masking the aperture between a positionally stable wall and a shaft penetrating a bore in the wall, comprising:

a first sealing sleeve which abuts the wall and the shaft with respective end regions in a fixedly tight manner, and which forms a bellows which compensates an offset of the shaft within the bore dictated by tolerances, and a second sleeve fixedly connectable to the first sealing sleeve such that when the second sleeve is connected to the first sealing sleeve the first and second sleeves form conjointly with their walls, in the region of the bellows, a closed sound insulating air chamber which chamber is closed by connection points when the sleeves are connected to one another.

2. A sealing sleeve arrangement according to claim 1, wherein the second sleeve forms a cylindrical external circumference between the common connections points and envelopes the first sealing sleeve, and wherein the sleeves are located at a mutual wall interval which admits a relative movement of the sleeves between the common connection points during the compensating movement of the bellows of the first sealing sleeve while retaining the fixed connection.

3. A sealing sleeve arrangement according to claim 1, wherein the wall is an end wall of a passenger space in a motor vehicle and the shaft is a steering spindle shaft.

4. A sealing sleeve arrangement for masking the aperture between a positionally stable wall and a shaft penetrating a bore in the wall, comprising:

a first sealing sleeve which abuts the wall and the shaft with respective end regions in a tight manner, and which forms a bellows which compensates an offset of the shaft within the bore dictated by tolerances;

a second sleeve connectable to the first sealing sleeve such that when the second sleeve is connected to the first sealing sleeve the first and second sleeves form conjointly with their walls, in the region of the bellows, a closed sound insulating air chamber which chamber is closed by the connection points when the sleeves are connected to one another; and wherein the second sleeve is molded integrally onto the first sealing sleeve at one end, is positionable around the first sleeve by inversion and is connectable thereto by clipping in its free end.

5. A sealing sleeve arrangement for masking the aperture between a positionally stable wall and a shaft penetrating a bore in the wall, comprising:

a first sealing sleeve which abuts the wall and the shaft with respective end regions in a tight manner, and which forms a bellows which compensates an offset of the shaft within the bore dictated by tolerances;

a second sleeve connectable to the first sealing sleeve such that when the second sleeve is connected to the first sealing sleeve the first and second sleeves form conjointly with their walls, in the region of the bellows, a closed sound insulating air chamber which chamber is closed by the connection points when the sleeves are connected to one another;

wherein the second sleeve forms a cylindrical external circumference between the common connections points and envelopes the first sealing sleeve, and wherein the sleeves are located at a mutual wall interval which admits a relative movement of the sleeves between the common connection points during the compensating movement of the bellows of the first sealing sleeve while retaining the fixed connection; and wherein the second sleeve is molded integrally onto the first sleeve at one end, is positionable around the first sleeve by inversion and is connectable thereto by clipping in its free end.

* * * * *